United States Patent [19]

Charron

[11] 4,085,482
[45] Apr. 25, 1978

[54] MEAT TENDERING MACHINE

[76] Inventor: Gérard Charron, 232 Lachapelle Street, Sherbrooke, Canada, J1G 3J2

[21] Appl. No.: 720,565

[22] Filed: Sep. 7, 1976

Related U.S. Application Data

[63] Continuation-in-part of Ser. No. 583,627, Jun. 4, 1975, abandoned.

[51] Int. Cl.² ............................................. A22C 9/00
[52] U.S. Cl. ........................................ 17/26; 17/28
[58] Field of Search ..................... 17/26, 29, 27, 28, 25

[56] References Cited

U.S. PATENT DOCUMENTS

| | | | |
|---|---|---|---|
| 315,723 | 4/1885 | Carter | 17/26 |
| 949,762 | 2/1910 | Foster | 17/28 |
| 1,991,439 | 2/1935 | Wood | 17/26 |
| 2,251,801 | 8/1941 | Plitt, Sr. et al. | 17/26 |
| 2,561,867 | 7/1951 | Jackson | 17/26 |
| 2,622,269 | 12/1952 | Berglund et al. | 17/26 |
| 2,704,859 | 3/1955 | Klingens | 17/26 |
| 2,718,028 | 9/1955 | Read et al. | 17/26 |
| 2,802,235 | 9/1957 | Brown | 17/26 |
| 3,716,893 | 2/1973 | Vogelsang | 17/26 |

*Primary Examiner*—Louis G. Mancene
*Assistant Examiner*—Paul J. Hirsch

[57] ABSTRACT

A meat tendering machine particularly adapted to keep most of the blood within the meat and including a safety feature protecting against undesired access to the meat tendering rollers. This meat tendering machine includes a base, a hollow column mounted on the base, a casing projecting in cantilever fashion from the hollow column, a pair of meat tendering rollers in the casing and removably engaging with a drive in the hollow column, and meat tendering teeth on the periphery of the rollers. The meat tendering teeth of each roller are disposed in a plurality of annular rows, the teeth in any one row being spaced from one another circumferentially of the roller by intervening notches having a convex bottom coinciding with the cylindrical outer face of the roller, the teeth of each second row being in substantial register longitudinally of the roller, the teeth of any one row being in substantial register with the notches of adjacent rows longitudinally of the roller, the several rows being spaced from one another longitudinally of the roller by an intervening annular zone. The teeth of one roller are staggered relative to the teeth of the other roller, such that the teeth of one roller engage the annular zone of the other roller, and vice versa. The teeth of one roller, when engaging said annular zones of the other roller, are in register with the teeth of the other roller longitudinally of the rollers, the teeth of the two rollers cooperatively formed with the annular zones, meat holding cavities in which the meat is not subjected to the compression effect of the teeth, and wherein the blood from the compressed meat zones can flow.

2 Claims, 6 Drawing Figures

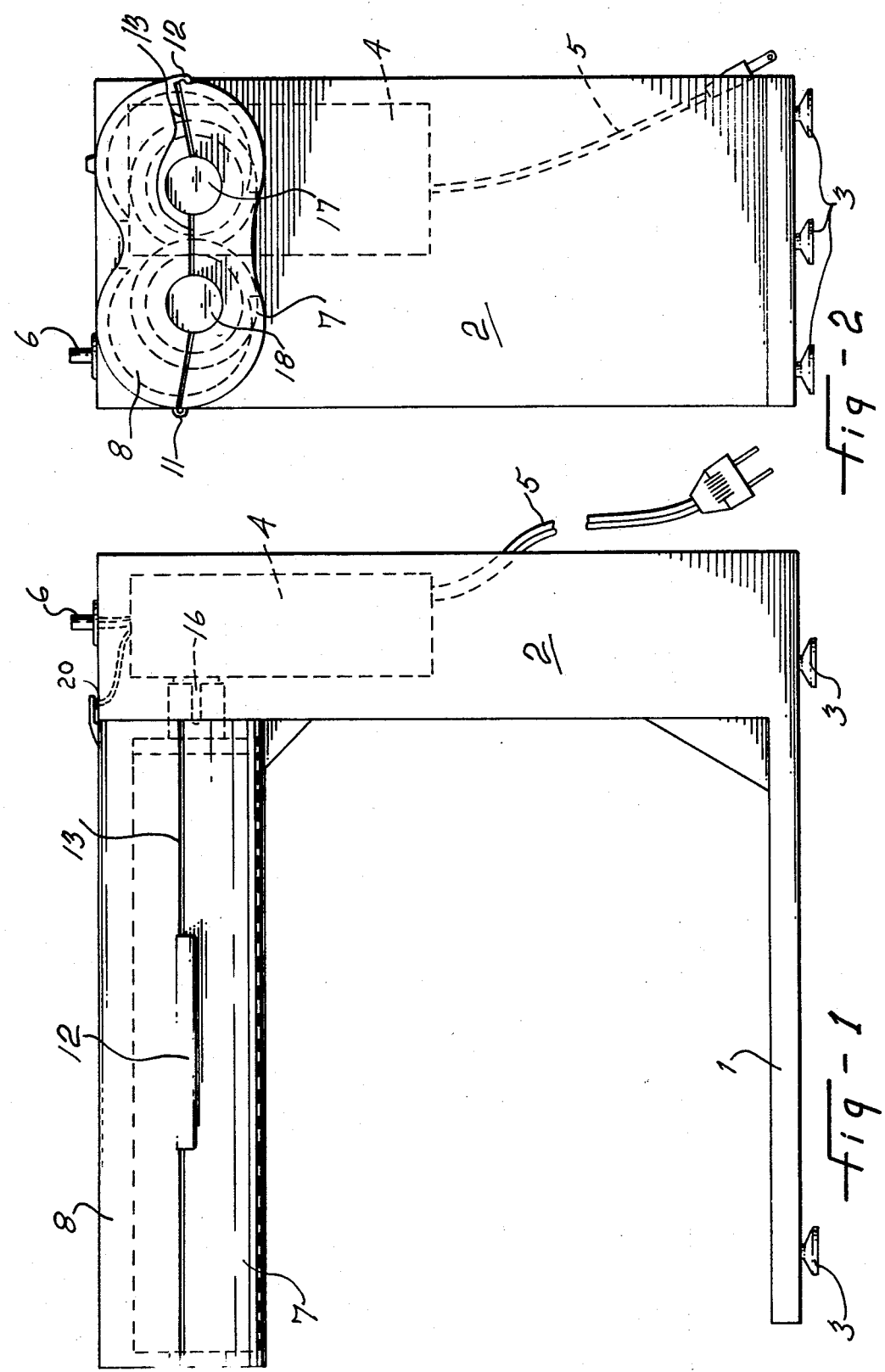

MEAT TENDERING MACHINE

This application is a continuation-in-part of application Ser. No. 583,627, filed June 4th, 1975, now abandoned.

This invention relates to a meat tendering machine, in particular of the type including at least one pair of meat tendering rollers.

Machines of the above type have been proposed in the past, but they are found unsatisfactory, since they excessively cut and press the meat and thus expel most of the blood from the latter. In the aforementioned anterior meat tendering machines, the cutters or teeth so closely adjoin each other that the whole area of the meat or steak is pressed by passage between these tendering elements and the blood internally contained in the meat is released and wasted. Besides, the anteriorly proposed cutting or tendering elements are unduly sharp and thus excessively cut and shear the meat, thereby also contributing to the loss of the internal blood.

It is a general object of the present invention to provide a meat tendering machine which is adapted to retain the internal blood in the meat.

It is a more specific object of the present invention to provide a meat tendering machine of the above type, wherein the rollers are provided with teeth particularly constructed and spaced relative to each other to keep within the meat all its internal blood while still effectively tendering the latter.

It is another object of the present invention to provide a meat tendering machine of the above type, wherein the rollers are provided with teeth adapted to form meat holding cavities between them upon interengagement between each other, whereby the internal blood is allowed to remain in the meat in those cavities.

It is a further object of the present invention to provide meat tendering machine of the above type with a casing for the rollers, which allows easy cleaning of the latter and has a safety feature against undesired access to the rollers.

The above and other objects and advantages of the present invention will be better understood with the following detailed description of a preferred embodiment thereof, which is illustrated by way of example only in the accompanying drawings, in which:

FIG. 1 is a side elevation view of a meat tendering machine according to the present invention;

FIG. 2 is an end elevation view as seen from the left in FIG. 1;

Figure 3:
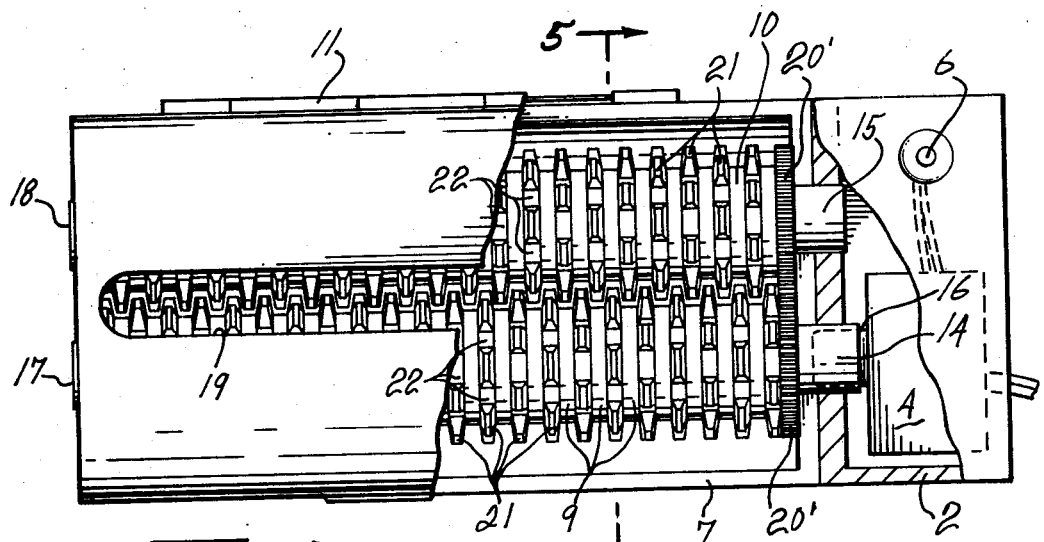
FIG. 3 is a top view partly broken away of the meat tendering machine of the preceding figures.

The illustrated meat tendering machine includes a support formed of a base 1 and a hollow column 2 projecting endwise upwardly from the base 1 and integrally formed therewith. Suction cups 3 are fixed under the base 1 to fixedly adhere the machine onto a supporting surface. The hollow column 2 forms a housing for an electric motor 4 having an electric cord 5 and operated by a push button switch 6.

An elongated casing is secured endwise in cantilever fashion to the top of the hollow column 2 and in overlying relationship with the base 1. This elongated casing includes a bottom casing portion 7 and a top casing portion 8 which are complementarily profiled to house a pair of meat tendering rollers 9 and 10. The top casing portion 8 is pivoted to the bottom casing portion 7 by a hinge 11 and releasably locks to the latter by a pressure catch 12. It must be noted that the catch 12 locks the top casing portion 8 with a gap 13 between the latter and the bottom casing portion 7.

The meat tendering rollers 9 and 10 are journalled in the hollow column 2 by the ends 14 and 15 respectively. The end 14 of the roller 9 is diametrically slotted and is driven by a flat key 16 engaging therein. The other ends 17 and 18 of the rollers 9 and 10 are removably held by the top casing portion 8 onto the bottom casing portion 7. It may be easily understood that the rollers 9 and 10 are thus readily removable for cleaning thereof.

The top casing portion 8 is formed with a meat inserting slot 19 extending lengthwise thereof in overlying relationship to the meshing portion of the rollers. A switch 20 is mounted in cooperation between the top of the top casing portion 8 and the top of the hollow column 2 and opens the circuit to motor 4 when top casing portion 8 is lowered. If a child, for instance, undesirably tries to reach the rollers 9 and 10 through the slot 19, the pressure thus produced on the top casing portion 8 lowers the latter, due to the gap 13, and the switch is actuated and interrupts the motor 4.

The rollers 9 and 10 are provided with intermeshing gears 20' such that the roller 9 drives the roller 10 in counterclockwise relationship thereto. Each roller is formed with meat tendering teeth 21 projecting at the periphery thereof and interengaging between the teeth of the other roller. The teeth 21 on each roller are arranged into axially spaced-apart annular rows within intervening free annular zones, such that the annular rows of roller 9 axially alternate with the rows of roller 10. Thus, the teeth of one roller engage the free annular zones of the other roller, and vice versa.

In each annular row of the rollers, the meat tendering teeth 21 are circumferentially equally spaced apart in gear fashion and thus form circumferential interspaces 22 between them. These interspaces 22 have a bottom constituted by the cylindrical outer surface of roller 9 or 10. In other words, the teeth of each second annular row are in substantial register, longitudinally of the roller. The two rollers are arranged such that the teeth of each annular row of teeth of one roller laterally register in pairs with the teeth of an axially adjacent row of teeth of the other roller and thus define axially juxtaposed pairs of adjacent rows having pairs of axially registering teeth and pairs of axially registering interspaces. Each such pair of axially registering interspaces defines what is hereinafter called a cavity, the function of which is to hold a portion of meat out of contact with teeth of the rollers. The pairs of teeth of each of the afore-mentioned pairs of adjacent rows are staggered relative to the similar pairs of teeth of any juxtaposed other pair of adjacent rows. Thus, each of the afore-mentioned pairs of axially registering interspaces or each cavity is axially confined between two pairs of axially registering teeth of the two juxtaposed pairs of adjacent rows.

Figure 4:
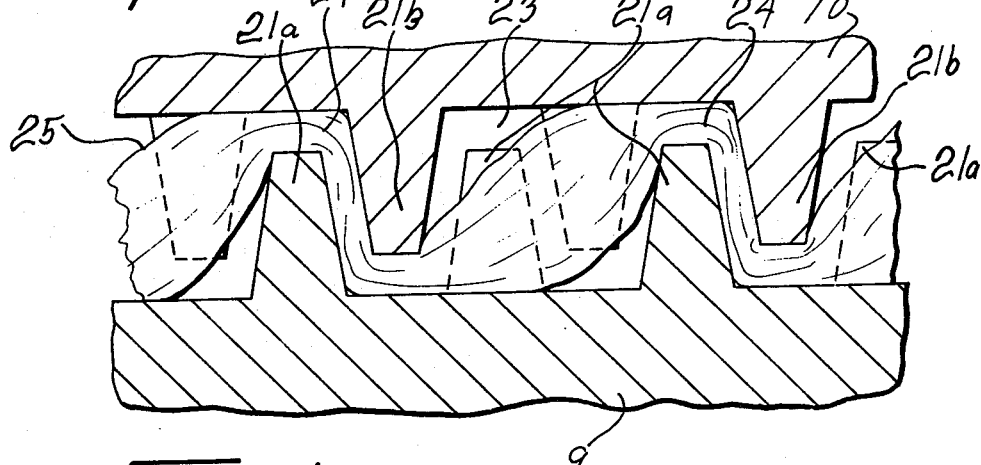
FIG. 4 is an axial cross-sectional view through the meshing teeth of the rollers as seen along line 4—4 in FIG. 5.
Figure 5:
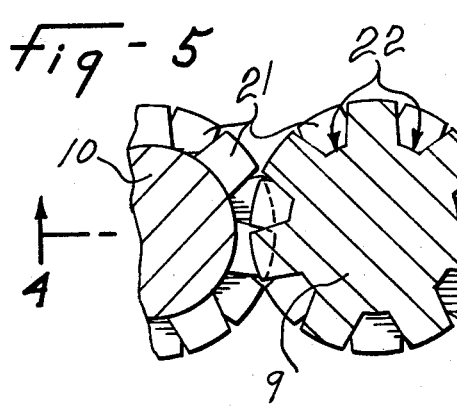
FIG. 5 is a transverse cross-sectional view through the rollers as seen along line 5—5 in FIG. 3.

In FIG. 4, each of the axially adjacent pair of teeth 21a and 21b constitutes one of the afore-mentioned pairs of axially registering teeth. It must be noted that between the two illustrated pairs of teeth 21a and 21b there is a substantially two-tooth wide space 23 which is formed of an interspace 22 of one annular row of one roller and an interspace 22 of one adjacent annular row of the other roller. In other words, the space 23 constitutes one of the afore-described cavities formed by axially registering interspaces 22 upon registry of the surrounding teeth.

Each tooth 21 is formed with a blunt outer end and tapers toward the latter.

As can be seen in FIG. 4, when the meat or steak is passed between the rollers 9 and 10, the teeth will bite into the meat and the portions of the latter which register with the cavities or spaces 23 are loosely held such that they are not compressed and the internal blood in the meat is allowed to flow to those portions and thus remain inside the meat.

Figure 6:
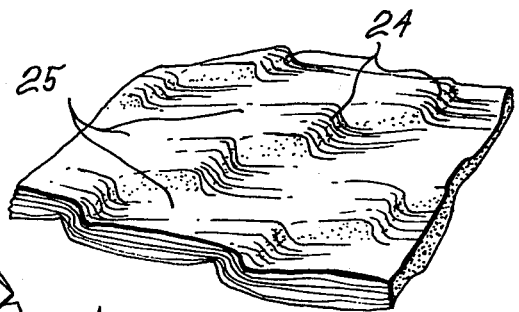
FIG. 6 is a perspective view illustrating the action of the meat tendering teeth on a piece of meat.

In FIG. 6, the bumps 24 indicate the portions compressed and shaped by the teeth while the valleys 25 indicate the portions of the meat which register with the cavities or spaces 23.

As shown in FIG. 3 and understood from the latter, the bottom casing portion 7 is formed with an elongated aperture underlying the slot 19 of the top casing portion 8. Thus, the bottom casing portion 7 forms mutually facing edges along the laterally opposite sides of this elongated aperture. Each of these edges is toothed to form a comb whose teeth 7' alternatively engage between the rows of teeth 21 of the corresponding roller 9 or 10. These combs are provided to disengage the meat from the teeth 21 and thus prevent wrapping thereof around one or the other of the rollers.

What I claim is:

1. A meat tenderizing machine comprising a pair of cylindrical rollers extending alongside each other, drive means connected to the rollers and counterrotating the latter at the same speed, each roller having similar meat tenderizing teeth projecting outwardly at the periphery thereof and disposed in annular rows with the teeth equally separated by intervening free spaces within said annular rows and with the bottom of said free spaces substantially coinciding with the outer cylindrical surface of the roller, the annular rows of teeth being spaced axially of the roller to define free annular zones between the annular rows of each pair of annular rows, the teeth of each second annular row of any one roller being in substantial register axially of the roller, the teeth of any one annular row of any one roller being in substantial register with the intervening free spaces of adjacent annular rows axially of the roller, the teeth of one roller engaging the annular zones of the other roller and the teeth of the other roller engaging the annular zones of the one roller, the teeth of any one roller, when fully engaging the annular zones of the other roller, being, axially of the roller, in register with, close to but out of contact with, a tooth of the other roller on one side of said teeth and being, axially of the roller, in register with one intervening free space and with one annular zone of the other roller, on the other side of said teeth, the width of the teeth of any one roller, axially of the roller, being smaller than the sum of the widths of said intervening free space and of the adjacent annular zone and being greater than the space separating said teeth from the teeth of the other roller on said one side, this registering intervening space and adjacent annular zone defining a meat holding cavity wherein meat is free of compression by the teeth to enable flowing into the portion of the meat in said cavity of the internal blood of the meat compressed out by the action of the teeth on the remaining zones of the meat.

2. A meat tenderizing machine as claimed in claim 1, wherein each tooth has a substantially rectangular base with its longer dimension extending annularly of the roller and each tooth tapering radially outwardy and terminating in a blunt end, the inter-engaging teeth of both rollers leaving free spaced therebetween and the blunt ends of the teeth of any one roller leaving a free space with the outer cylindrical surface of the other roller.

* * * * *